W. M. McEWEN.
EXTENSION UNIT FOR AUTOMOBILE CHASSIS.
APPLICATION FILED JAN. 22, 1917.

1,360,770.

Patented Nov. 30, 1920.

Witnesses:
Harry R. L. White
W. P. Kilroy

Inventor:
Willard M. McEwen,
By Rummler & Rummler
Attys.

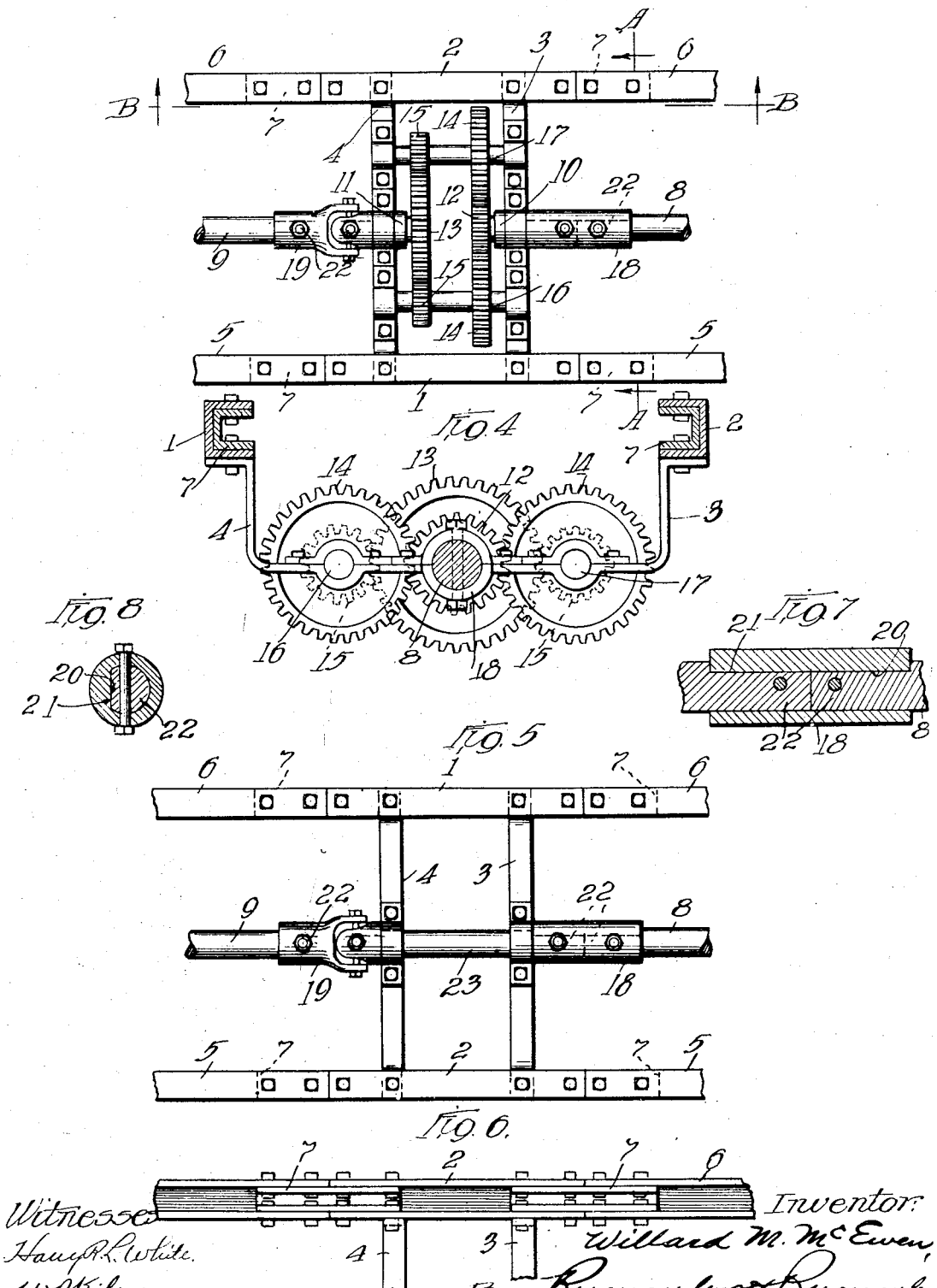

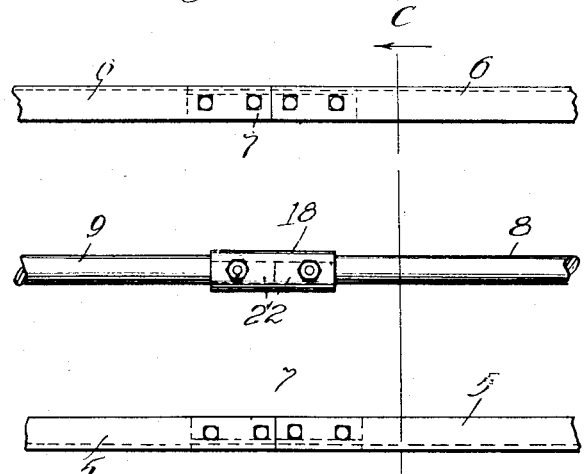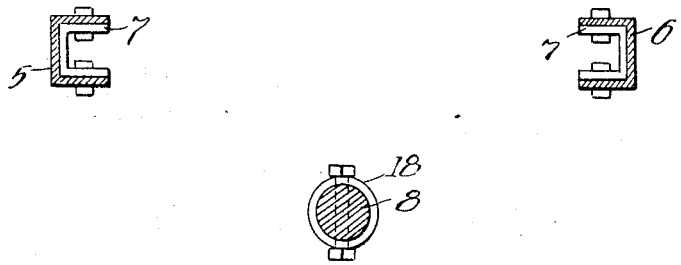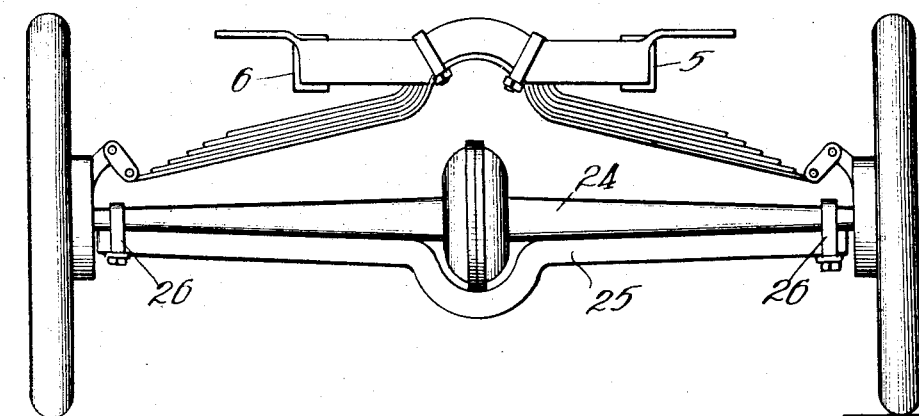

# UNITED STATES PATENT OFFICE.

WILLARD M. McEWEN, OF CHICAGO, ILLINOIS.

EXTENSION UNIT FOR AUTOMOBILE-CHASSIS.

1,360,770.

Specification of Letters Patent.   Patented Nov. 30, 1920.

Application filed January 22, 1917.   Serial No. 143,696.

*To all whom it may concern:*

Be it known that I, WILLARD M. McEWEN, a citizen of the United States of America, and a resident of Chicago, county of Cook, and State of Illinois, have invented certain new and useful Improvements in Extension Units for Automobile-Chassis, of which the following is a specification.

The main objects of this invention are to provide improved means for converting a chassis construction normally arranged for comparatively short bodies, such as passenger bodies, into a form suitable for supporting longer bodies, as for example truck or omnibus bodies; to provide means of this kind which is in the nature of an extension unit designed to be inserted between the sections of the chassis after the same has been transversely severed to form two such sections; to provide mechanism on said extension unit adapted to connect together the driving shaft sections, which mechanism may afford a direct connection or which may include speed reducing gearing; to provide such an arrangement of the extension unit that when removed from the chassis, the two original sections may be conveniently reassembled so as to reform the normal chassis; and to provide an extension unit of this kind which is simple and inexpensive in construction and which can be conveniently attached to or detached from the chassis sections by persons of no especial skill.

An illustrative embodiment of this invention is shown in the accompanying drawings, in which—

Fig. 3 is an enlarged plan of the extension unit.

Fig. 4 is an end view of the same as viewed from the plane of the line A—A of Fig. 3.

Fig. 5 is a plan of the extension unit showing a modified form of connection for the driving shaft sections.

Fig. 6 is a detail view, as viewed from the plane of the line B—B of Fig. 3, showing the method of attaching the side members of the extension unit to the side members of the chassis sections.

Fig. 7 is an enlarged sectional detail showing the coupling by means of which the shaft sections are connected together.

Fig. 8 is a transverse sectional detail of the same.

Fig. 9 is a fragmentary plan showing the joint formed when the chassis sections are reassembled.

Fig. 10 is a transverse detail of the same taken on the line C—C of Fig. 9.

Fig. 11 is a rear end view of the chassis showing the attachment of the reinforcing member for the rear axle.

Figure 1:
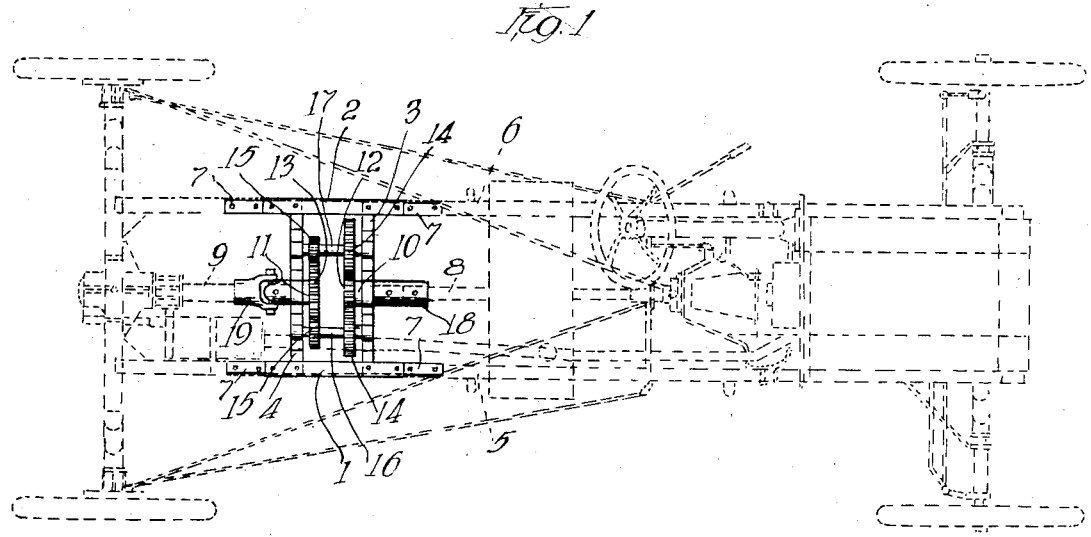
Figure 1 is a plan, in dotted outline, of an automobile chassis having the extension unit, shown in full outline, inserted therein, whereby the structure will be extended so as to more suitably serve as a truck chassis.
Figure 2:
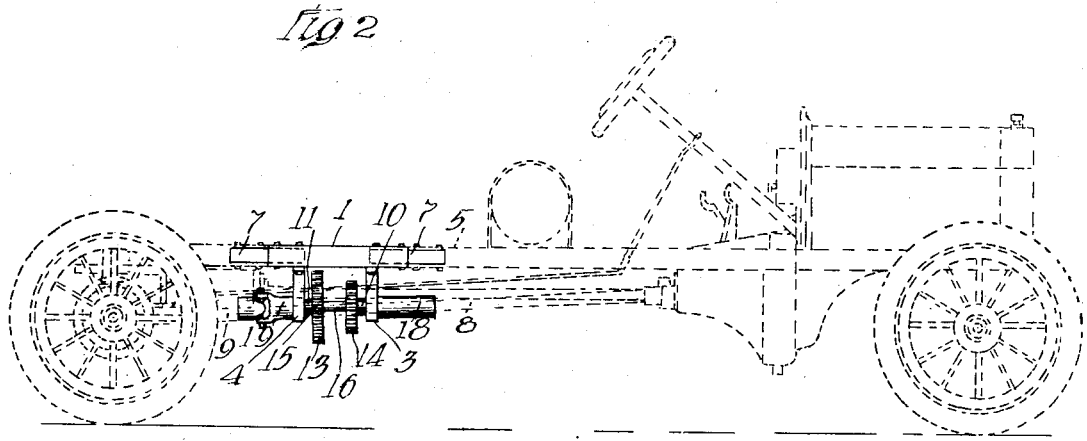
Fig. 2 is a side elevation of the same.

In the construction shown in the drawing, the extension unit comprises a frame, made up of a pair of side members 1 and 2 rigidly secured together by means of transverse braces 3 and 4, all of which is so arranged that the unit may be inserted bodily between the two sections of an automobile chassis, said sections being formed by severing the chassis frame and driving shaft in two, on a transverse plane near the rear end of the chassis.

The side members 1 and 2 of the extension unit are preferably of the same cross sectional construction as the side members 5 and 6 of the automobile chassis and are arranged to fit between the ends of and in alinement with said side members. Members 7 are provided for securing the side members of the unit and the frame together. Where the members 1, 2, 5 and 6 are of channel-shape construction, the members 7 may be likewise of channel shape and of a size that will allow them to fit within the channel of the members 1, 2, 5 and 6, or over said members. In the embodiment herein illustrated, the members 7 are arranged to fit within the side members, as shown in Fig. 6, the same being arranged to span the joint between the respective members and be bolted thereto, as shown in the figures.

Suitable mechanism is journaled upon the braces 2 and 4 so as to connect the driving shaft sections 8 and 9. This mechanism may be either in the form of speed reducing gearing, which would be necessary when the chassis is to be used for heavy truck work, or it may be in the form of a direct connection, where the chassis is to be used for comparatively light work.

In providing a speed reducing mechanism, shaft sections 10 and 11 are journaled on the respective braces 3 and 4 and provided with gears 12 and 13 which mesh respectively with pairs of gears 14 and 15 carried on the shaft sections 16 and 17 journaled at respectively opposite sides of the shaft sections 10 and 11. The desired reduction in speed is effected by having the gears 12 and 15 made correspondingly small, whereas the gears 13 and 14 are made correspondingly large. Shaft couplings 18 and 19 are provided for connecting the shaft sections 10 and 11 to the ends of the driving shaft sections 8 and 9 respectively. The shaft couplings 18 and 19, which are more clearly illustrated in Figs. 7 and 8, are each provided with an integral shoulder or key 20 which is adapted to engage with a correspondingly flattened part 21 of the respective shaft ends. Holes are also drilled through the coupling and shaft ends so as to permit bolts and nuts 22 to be used for further securing the shaft sections together in rotating relation. The coupling 19 is preferably in the form of a universal joint of the type commonly in use, an example of which is to be found in the patent to Davison, No. 1,163,643.

In providing for a direct connection between the driving shaft sections 8 and 9, a shaft section 23 is journaled on the braces 3 and 4 in place of the shaft sections 10 and 11. The ends of the shaft 23 are connected by the couplings 18 and 19 to the driving shaft sections 8 and 9 respectively. This modification is suitable for use where it is not desired to provide for auxiliary speed reducing means, the operator simply relying upon the regular speed control mechanism of the vehicle. This would be permissible where it was intended to use the vehicle only for light loads.

When the chassis is to be used for heavy work, it will be found advantageous to reinforce the rear axle 24 of the vehicle. This may be accomplished by means of a reinforcing member or bar 25 (Fig. 11) secured to the rear axle by means of suitable clamps 26.

This extension unit may be a part of the original construction of the chassis, or it may be an auxiliary construction designed and arranged so as to be used for extending a chassis otherwise normally designed for supporting comparatively short vehicle bodies.

In the latter case, the extension unit is intended to be constructed so that it may be purchased by the owner of an automobile, normally designed for the comparatively short bodies, where it is desired to lengthen the chassis so as to accommodate bodies of greater length. In this case, it is intended that the chassis frame and driving shaft be severed on a transverse plane near the rear part thereof. The extension unit is then inserted between the sections and connected thereto, as has hereinbefore been explained.

Whether constructed as an original part of the chassis or as an auxiliary part, the extension unit is designed so that the two main chassis sections may be reassembled. To this end, the members 7 may be used for securing the ends of the side members 5 and 6 together as shown in Figs. 9 and 10, in the same manner that said members are used to secure the side members 1 and 2 of the extension unit to the side members 5 and 6 of the chassis. Likewise, one of the couplings 18 or 19 may be used for rotatably connecting the ends of the driving shaft sections 8 and 9, as is also shown in Figs. 9 and 10.

Although but one specific embodiment of this invention has been herein shown and described, it will be understood that numerous details of the construction shown may be altered or omitted without departing from the spirit of this invention as defined by the following claims.

I claim:—

1. An insert element for lengthening an automobile chassis, whereof the frame and driving shaft are severed so as to form two sections, said element being in the nature of a unitary structure and comprising an extension frame adapted to be secured between and to the ends of the respective chassis sections, and means rotatably mounted on said extension frame and adapted to operatively connect the driving shaft sections of the two chassis sections.

2. An insert element for lengthening an automobile chassis, whereof the frame and driving shaft are severed so as to form two sections, said elements being in the nature of a unitary structure and comprising an extension frame adapted to be secured between and to the ends of the respective chassis sections, and mechanism carried by said extension frame and including speed reducing gearing adapted to operatively connect the driving shaft sections.

3. An insert element for lengthening an automobile chassis, whereof the frame and driving shaft are severed so as to form two sections, said elements being in the nature of a unitary structure and comprising an extension frame adapted to be secured between and to the ends of the respective chassis sections, a rotating means journaled on said extension frame and adapted to fit between said driving shaft sections, and coupling means adapted to rotatably connect said rotating means with the ends of said driving shaft sections.

4. An insert element for lengthening an automobile chassis, whereof the frame and driving shaft are severed so as to form two sections, said elements being in the nature of a unitary structure and comprising a pair of side members having the ends thereof adapted to be connected to and in alinement with the ends of the side members of the frame sections of the chassis, transverse braces connecting said side members, bearings formed on said braces, a rotatable member journaled in said bearings, and means for connecting said rotatable member with the sections of said driving shaft.

5. An insert unit for lengthening an automobile chassis, whereof the frame and driving shaft are severed so as to form two sections, comprising a pair of side members having the ends thereof adapted to be connected in alinement with the ends of the side members of the frame sections of the chassis, a pair of transversely disposed braces connecting said side members, bearings formed on said braces, a pair of shaft sections journaled on said braces respectively and alined with each other and with said driving shaft sections, means rotatably connecting said shaft sections to the ends of said respective driving shaft sections, other shaft sections at opposite sides of said first-mentioned shaft sections spanning said braces and having the ends thereof journaled on said braces, and gearing connecting said first-mentioned shaft sections with said second-mentioned shaft sections and being arranged so as to reduce the speed of the rear driving shaft section with relation to the forward section.

6. An insert unit for lengthening an automobile chassis, whereof the frame and driving shaft are severed so as to form two sections, comprising a frame having a pair of side members of substantially the same cross section as the side members of the chassis frame, said frame being adapted to be arranged between the chassis sections with said side members thereof abutting and in alinement with the side members of said chassis frame, means interfitting with the ends of the side members of said extension unit and said chassis frame sections and adapted to interlock the same in their assembled positions, and mechanism carried by said frame adapted to rotatively connect the driving shaft sections.

7. An automobile chassis, comprising a frame, normally arranged to support a passenger body, transversely severed intermediate its forward and rearward ends so as to form two sections, an insert extension element in the nature of a complete unitary structure interposed between said sections and connected thereto in alinement with the various parts thereof, said element having mechanism thereon for rotatively connecting the driving shaft sections.

8. The combination of an automobile chassis having both its frame and driving shaft cut in two intermediate the rear end of said chassis and the motor, with a frame extension element in the nature of a unitary structure interposed between the parts of said chassis frame and connected thereto, and a speed change gearing carried by said element and interposed between and connected to the parts of said driving shaft.

Signed at Chicago this 20th day of January, 1917.

WILLARD M. McEWEN.